United States Patent
Anagnost et al.

(10) Patent No.: US 6,463,365 B1
(45) Date of Patent: Oct. 8, 2002

(54) SYSTEM AND METHOD FOR CONTROLLING THE ATTITUDE OF A SPACE CRAFT

(75) Inventors: John J. Anagnost, Torrance; Paul C. Kiunke, Newbury Park, both of CA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/496,140

(22) Filed: Feb. 1, 2000

(51) Int. Cl.$^7$ ................................................ B64G 1/28
(52) U.S. Cl. ........................................ 701/13; 244/164
(58) Field of Search ............... 701/13, 226; 244/158 R, 244/164, 165, 171

(56) References Cited

U.S. PATENT DOCUMENTS

| | | | | |
|---|---|---|---|---|
| 4,723,735 A | * | 2/1988 | Eisenhaure et al. | 244/165 |
| 5,014,936 A | * | 5/1991 | Nauck | 244/158 R |
| 5,067,673 A | * | 11/1991 | Fong | 244/165 |
| 5,131,611 A | * | 7/1992 | Vollaro | 244/158 R |
| 5,441,222 A | * | 8/1995 | Rosen | 244/165 |
| 5,751,078 A | * | 5/1998 | Loewenthal | 310/36 |
| 5,758,846 A | * | 6/1998 | Fowell | 244/165 |
| 6,152,402 A | * | 11/2000 | Augenstein | 244/164 |

FOREIGN PATENT DOCUMENTS

| EP | 0 441 205 A1 | 8/1991 |
|---|---|---|
| EP | 0 878 396 A1 | 11/1998 |

OTHER PUBLICATIONS

Mingori, D. L., Harrison, J.A., Tseng, G.T.: "Semipassive and Active Nutation Dampers for Dual–Spin Spacecraft", Journal of Spacecraft And Rockets, vol. 58, 5/71, pp. 448–455.

White, W. H.: "The Advanced Vela Spacecraft: A Spinning Zero–Momentum Vehicle" Nov. 1967 (1967–11), pps. 243–255.

* cited by examiner

Primary Examiner—Michael J. Zanelli
Assistant Examiner—E Gibson
(74) Attorney, Agent, or Firm—Colin M. Raufer; Leonard A. Alkov; Glenn H. Lenzen, Jr.

(57) ABSTRACT

A system (30) for adjusting the orientation of a spacecraft adapted for use with a satellite (10). The system (30) includes a first control circuit (32, 38, 40) for canceling any momentum of the spacecraft via a counter-rotating spacecraft bus (16, 18). A second controller (32, 42, 44, 46, 48) orients the spacecraft via the application of internal spacecraft forces. In a specific embodiment, the spacecraft bus (16, 18) serves a dual use as storage section and includes a mass (16) having a moment of inertia on the same order as the moment of inertia of the satellite (10). The satellite (10) includes a bus section (16) and a payload section (14). The mass (16) includes the bus section (16). The first control circuit (32, 38, 40) runs software to selectively spin the mass (16) to cancel the momentum of the satellite (10). The software computes an actuator control signal, via a computer (32), that drives a first actuator (38) that spins the mass (16). The first control circuit (32, 38, 40) further includes a circuit for determining the inertial angular rate of the satellite (10) that includes a gyroscope sensor package (34) in communication with the computer (32). The gyroscope sensor package (34) provides a rate signal to the computer (32) that is representative of the momentum of the satellite (10). The computer (32) runs software for generating the actuator control signal in response to the receipt of the rate signal from the gyroscope sensor package (34). The second controller (32, 42, 44, 46, 48) includes a first reaction wheel (20) having an axis of rotation (26) approximately perpendicular to an axis of rotation (28) of a second reaction wheel (22). The first and second reaction wheels (20, 22) are rigidly mounted to the spacecraft bus (18, 16) and are free to spin about their respective axis. The first and second reaction wheels (20, 22) are selectively spun via first and second actuators (44, 48), respectively, in response to the receipt of first and second steering control signals, respectively.

34 Claims, 5 Drawing Sheets

SYSTEM AND METHOD FOR CONTROLLING THE ATTITUDE OF A SPACE CRAFT

BACKGROUND OF THE INVENTION

1. Field of Invention

This invention relates to systems for controlling the attitude of a spacecraft. Specifically, the present invention relates systems for controlling the attitude of spinning satellites.

2. Description of the Related Art

Satellites are used in a variety of demanding applications ranging from communications systems and global positioning systems to space telescope systems. Such applications often require satellites with accurate maneuvering, station keeping, and attitude adjustment capabilities.

Systems for accurately adjusting satellite attitude are particularly important in communications and space telescope applications. For example, ground based receivers or transceivers aimed at a communications satellite often require the satellite to remain at its current position and orientation to communicate with the satellite. Similarly, space telescope satellites are often precisely oriented for focusing on a particular region in space.

Without attitude control mechanisms and spacecraft maneuvering systems, a satellite will spin about a random axis. The spin may result from moments generated during satellite launch, from solar radiation pressure, and/or gravity gradients.

To control spacecraft attitude, thrusters are often employed. The thrusters provide coarse control over the orientation of the satellite but typically lack the ability to make fine attitude adjustments required by many satellite applications. The thrusters also consume excess fuel, which increases the weight and cost of the spacecraft and limits the usable life span of the spacecraft.

The thrusters are typically employed on most spacecraft, including those with non-zero initial momentum such as spinning communications satellites. When used on a spinning spacecraft, the thrusters must provide large torques to move the spacecraft momentum vector to a desired location. (This is known as the bicycle wheel effect.) The requisite torques result in additional fuel consumption.

To provide finer control over spacecraft orientation and to reduce the need for expensive thrusters, a system employing a gimbaled momentum wheel is often employed. The system is disclosed in U.S. Pat. No. 5,441,222, by H. Rosen, entitled ATTITUDE CONTROL OF A SPINNING SPACECRAFT, the teachings of which are herein incorporated by reference. The system includes a two-axis gimbaled momentum wheel. The wheel is spun to cancel existing spacecraft momentum, resulting in a zero momentum spacecraft. The zero momentum spacecraft is then oriented via internal moments created by actuators that push on the wheel assembly to create reaction forces in desired directions.

Use of the gimbaled momentum wheel however, has several drawbacks. Spacecraft design constraints typically limit the size and mass of the momentum wheel. Consequently, the momentum wheel must spin at high rates to cancel the total momentum of the spacecraft. Often the momentum wheel must spin faster than 5000 revolutions per minute. This can result in undesirable high frequency spacecraft vibrations that are difficult to remove. Expensive and complex momentum wheel isolation systems and/or control loops are often required to reduce the undesirable high frequency disturbances.

Hence, a need exists in the art for a cost-effective system for precisely orienting a spacecraft. There is a further need for a system that does not introduce high frequency spacecraft vibrations or consume excess fuel.

SUMMARY OF THE INVENTION

The need in the art is addressed by the attitude control system for a spacecraft of the present invention. In the illustrative embodiment, the inventive system is adapted for use with a satellite having a payload upon which attitude control elements are mounted. A single degree of freedom joint connects the bus to the payload such that the bus rotates about a single degree of freedom relative to the payload. An actuator and a control circuit therefore are included for rotating the payload relative to the bus.

In a specific embodiment, the bus is connected to the payload via a single degree of freedom rotational joint (often called a Bapta joint). The bus is driven to cancel any momentum of the payload about a first axis. This yields a spacecraft with zero net momentum. An additional controller is included to orient the spacecraft via the application of internally generated spacecraft forces or moments to control the spacecraft in the two axes orthogonal to the first axis.

In specific embodiment, the satellite includes a bus section and a payload section. The spacecraft bus serves as a storage section and accommodates the attitude control elements. It is foreseen that the bus will have a mass moment of inertia on the same order as the moment of inertia of the payload. The first control circuit controls the orientation of the bus relative to the payload via the Bapta joint. The first control circuit is a spin controller that computes an actuator control signal that drives the Bapta joint actuator and thereby spins the payload. The first control circuit further includes a rate detector for determining the payload angular rate relative to the bus about each of three axes. In the present specific embodiment, the rate detector includes a gyroscope sensor package and a tachometer in communication with the spin controller. The gyroscope sensor package provides a rate signal to the computer that is representative of the spacecraft momentum. The computer runs software to generate the spin control signal in response to the receipt of the rate signal from the gyroscope and tachometer sensor packages.

In addition to the spin axis control circuit, two additional control circuits are employed to control the two attitude angles perpendicular to the spin axis. The type of control circuits required is application-specific and may be determined by one skilled in the art to meet the needs of a given application.

In one embodiment, the additional controllers control a first reaction wheel having an axis of rotation perpendicular to the axis of rotation of a gimbal upon which the first wheel is mounted. The gimbal has an axis of rotation approximately parallel to the axis of rotation of the Bapta mechanism. The control circuits use angular position and rate measurements from sensors mounted on the gimbal and reaction wheel as well as angular rate signals from a gyroscope sensor package to generate torque signals via a computer to torque motors mounted on the gimbal and reaction wheel.

In a second embodiment, the additional controller includes a first reaction wheel and a second reaction wheel. The first and second reaction wheels are rigidly mounted to the spacecraft bus and are free to spin about first and second mutually perpendicular axes respectively. The first and second reaction wheels are selectively spun via first and second actuators in response to first and second steering control signals, respectively. The control signals are generated by a controller. The controller is in communication with a gyroscope sensor package, a star tracker, and tachometers mounted on the wheels, as is common in the art.

In a third embodiment, the additional controller includes a reaction mass that is mounted to the spacecraft via a flexure suspension. A first force actuator applies a first force to the reaction mass to facilitate spacecraft orientation. A second force actuator applies a second force to the reaction mass to facilitate spacecraft orientation. The first and second force actuators are voice coil actuators that selectively produce first and second forces, respectively, in response to the receipt of steering control signals. These actuators are placed so that the spacecraft can be steered in the two axes orthogonal to the spin axis. Proximity sensors measure the angle of the reaction mass relative to the spacecraft. Spacecraft steering torque commands are then generated by software running on a computer that is in communication with a gyroscope sensor package, star tracker, and the proximity sensors.

The unique design of the present invention is facilitated by the use of the counter-rotating bus and accompanying Bapta mechanism to cancel spacecraft momentum. Due to the mass characteristics of the bus, typically only relatively slow rotation of the bus is required to cancel spacecraft momentum. The slow rotation results in a minimum of spacecraft vibration. Any resulting vibrations are typically low frequency vibrations that are easily removed by controllers well known in the art. This obviates the need for an expensive momentum wheel isolation system and results in a more cost-effective spacecraft. Furthermore, the bus of the Bapta mechanism is useable as a storage compartment, making efficient use of use of spacecraft space and weight.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
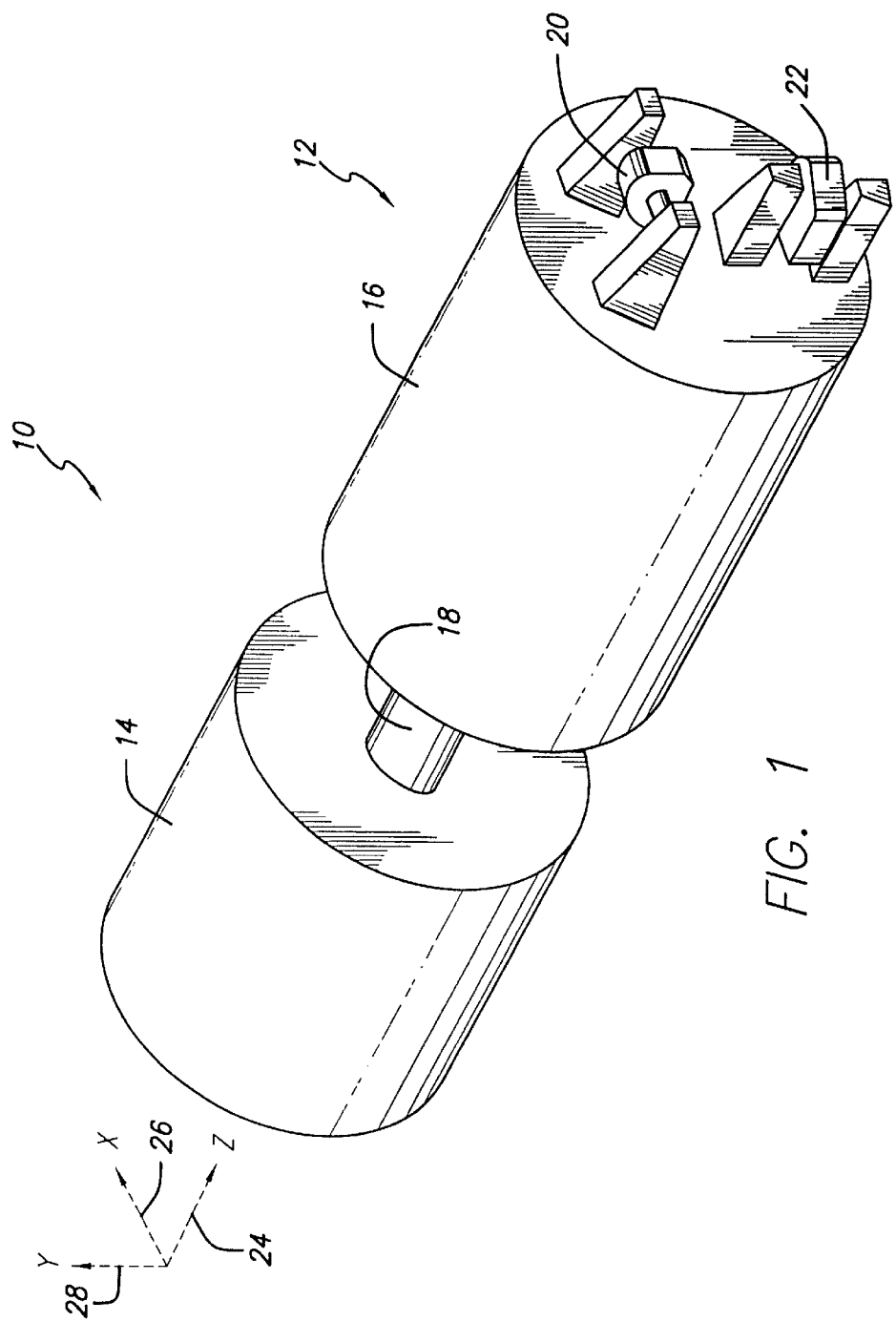
FIG. 1 is a diagram of a satellite constructed in accordance with the teachings of the present invention.

FIG. 1 is a diagram of a satellite 10 corresponding to a first embodiment of the present invention. The satellite 10 includes a payload 14 connected to an attitude control section 12. The attitude control section 12 includes a bus 16 connected at one end to the payload 14 via a Bapta joint 18. The Bapta joint 18, the bus 16, and the payload 14 are oriented concentrically along a z-axis 24. A first reaction wheel 20 and a second reaction wheel 22 are mounted at an opposite end of the bus 16 and oriented concentrically along an x-axis 26 and a y-axis 28, respectively.

The Bapta joint 18 has one degree of freedom, allowing the attitude control section 12 to only rotate about the z-axis 24. Similarly, the first reaction wheel 20 can only rotate about the x-axis 26 and the second reaction wheel 22 can only rotate about the y-axis 28. The x-axis 26 and the y-axis 28 both rotate about the z-axis when the attitude control section 12 spins about the z-axis 24.

Those skilled in the art will appreciate that the reaction wheels 20 and 22 may be replaced with wheels that rotate about different axes such as an axis angled with respect to the x-axis 26 and y-axis 28 without departing from the scope of the present invention. The wheels, however, should be positioned so that they can provide two different components of torques in different directions that are orthogonal to the z-axis 24, i.e., the spin axis of the satellite 10.

The attitude control section 12 includes actuators connected to the Bapta joint 18, and to the reaction wheels 20 and 22 that are selectively controlled by commands from a spacecraft computer as discussed more thoroughly below. The attitude control section 12 is selectively rotated about the Bapta joint 18 to cancel any existing spacecraft momentum. After the total momentum of the satellite 10 is reduced to zero, the reaction wheels 20 and 22 are spun to create torques along the x-axis 26 and/or y-axis 28 to move the satellite 10 into a desired orientation.

The attitude control section 12 is commanded (as discussed more fully below) to counter-rotate about the Bapta joint 18 with respect to the payload 14 to cancel the total momentum of the satellite 10.

Figure 2:
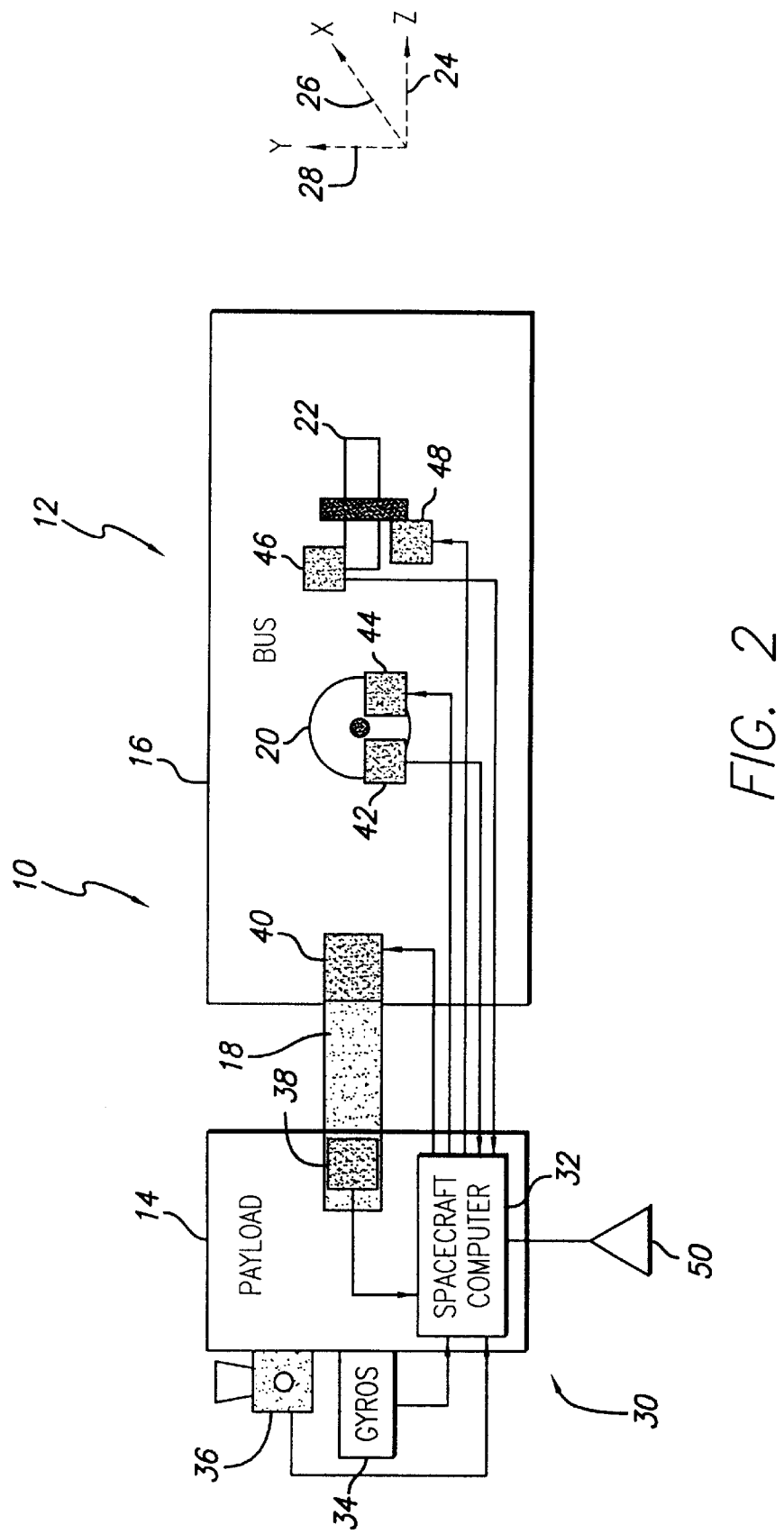
FIG. 2 is a block diagram showing an attitude control system implemented in the satellite of FIG. 1.

FIG. 2 is a block diagram showing an attitude control system 30 implemented in the satellite 10 of FIG. 1. The attitude control system 30 includes a spacecraft computer 32 positioned in the payload 14. The spacecraft computer 32 is connected to a gyroscope sensor package 34 and a star tracker 36, both mounted on an exterior of the payload 14 facing away from the bus 16. The spacecraft computer 32 is also connected to a Bapta position sensor 38, a Bapta actuator 40, a first wheel tachometer 42, a first wheel actuator 44, a second wheel tachometer 46, and a second wheel actuator 48.

In operation, the spacecraft computer 32 performs control calculations via an attitude control program (implemented preferably in software), as discussed more fully below, for controlling the Bapta actuator 40 and the wheel actuators 20 and 22 in response to input from the gyroscope sensor package 34, the star tracker 36, the Bapta position sensor 38, and the wheel tachometers 42 and 46.

Gyroscope sensors within the gyroscope sensor package 34 sense the rate of angular rotation of the payload 14 and provide primary feedback to the spacecraft computer 32. The attitude control program running on the spacecraft computer 32 is designed to rotate the attitude control section 12 including the bus 16 via the Bapta actuator 40 to cancel any existing spacecraft momentum detected by the gyroscope sensor package 34. The attitude control program also includes instructions to selectively spin the reaction wheels 20 and 22 to create moments to adjust the attitude of the satellite 10. The star tracker 36 provides feedback to the spacecraft computer 32 indicating the current orientation of the satellite 10

The attitude control program compares the desired spacecraft orientation as specified by attitude information stored in memory on the spacecraft computer 32 to attitude information provided by the star tracker 36 and gyroscope sensor package 34 to generate the steering control signals input by the spacecraft computer 32 to the wheel actuators 42 and 48. A receiver 50 mounted on the payload 14 and connected to the spacecraft computer 32 is provided to receive telemetry control signals to command the spacecraft to the desired orientation.

Those skilled in the art will appreciate that components of the attitude control system 30, such as the spacecraft computer 32 and the receiver 50 may be positioned in different locations than shown in FIG. 2 without departing from the scope of the present invention. For example, spacecraft computer 32 and the receiver 50 may be positioned on the bus 16.

After the satellite 10 is in the desired orientation as indicated by the input from the star tracker 36 and gyroscope sensor package 34, the wheels 20 and/or 22 are spun down so that the satellite 10 remains in the desired orientation. The first wheel tachometer 44 and the second wheel tachometer 46 provide information pertaining to the spin rates of the first reaction wheel 20 and the second reaction wheel 22, respectively, to the spacecraft computer 32. The attitude control program uses the wheel spin rate information to determine the existing spin rate of the wheels. The attitude control program uses the existing spin rate information to facilitate the generation of actuator control signals to control the first wheel actuator 42 and/or second wheel actuator 48 to adjust the spin rates by a predetermined amount. Similarly, the Bapta position or rate sensor 38 provides the attitude control program running on the spacecraft computer 32 with information pertaining to the rate of rotation of the bus 16 with respect to the payload 14. The attitude control program uses the rotation information to control the Bapta actuator 40 to adjust to adjust the rate of rotation by a predetermined amount.

Use of the Bapta position sensor 38 and the reaction wheel tachometers 44 and 46 facilitate the implementation of momentum dumping via the attitude control program running on the spacecraft computer 32.

Figure 3:
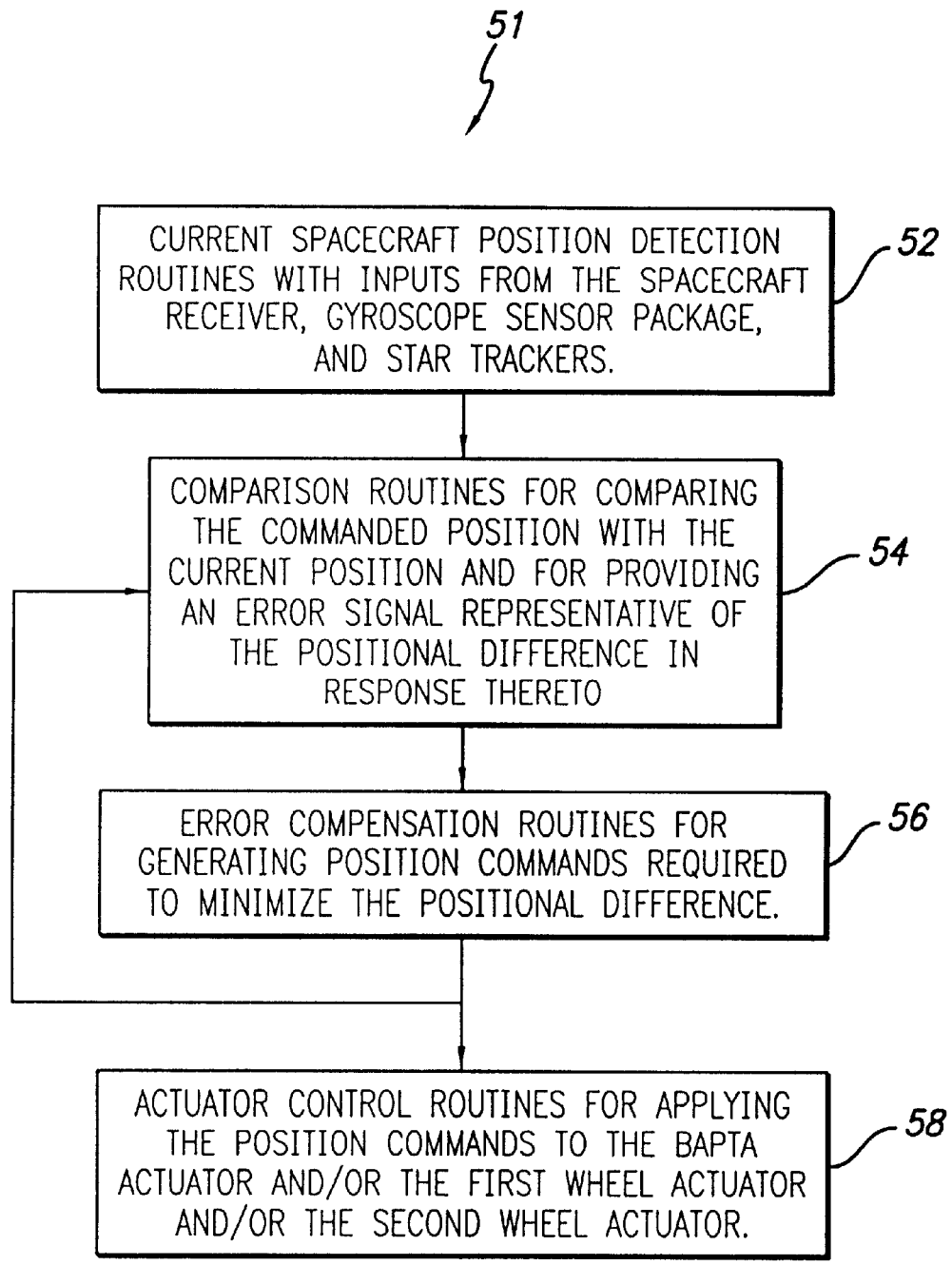
FIG. 3 is a diagram showing key functional blocks of a program implemented by the spacecraft computer of FIG. 2.

Software for implementing the above procedures is easily developed by those ordinarily skilled in the art with reference to the FIG. 3. In addition, those skilled in the art will appreciate that the reaction wheel tachometers 44 and 48 and the Bapta position sensor 38 may be replaced by alternative sensors elements without departing from the scope of the present invention. In this case, appropriate changes are made to the control program running on the spacecraft computer 32.

It is anticipated that for many applications the moment of inertia of the attitude control section 12 will be on the same order of magnitude as the moment of inertia of the payload 14. Consequently, in these applications, relatively slow counter rotation of the attitude control section 12 is required to cancel existing spacecraft momentum. Any spacecraft vibrations resulting from the counter rotating attitude control section 12 are easily removed by procedures well known in the art. This obviates the need for an expansive momentum wheel isolation system.

The bus 16 is loaded with electronic equipment and other devices (not shown) ordinarily stored on a satellite. Thus, the attitude control section 12 provides storage space within the bus 16 and serves to facilitate the control of the attitude of the satellite 10. By utilizing the bus 16 as a storage compartment, weight savings are achieved.

Prior art attitude control systems often require a relatively small yet massive momentum wheel. The high-density requirement of the momentum wheel typically rules out the use of the wheel as an auxiliary storage compartment.

The attitude control section 12 may be viewed as a low speed counter-rotating mechanism that rotates at a rate that exactly cancels the momentum of the payload 14. Use of a slow speed mechanism rather than a high-speed momentum wheel to cancel momentum obviates the need for an expensive momentum wheel isolation system. Those skilled in the art will appreciate that to control the spacecraft orientation, any internal mechanism that can provide two axes of torques orthogonal to the spin axis 24 will suffice as control actuators.

Due to the fact that the satellite 10 has net zero momentum, the satellite 10 may be oriented to an arbitrary location using internal forces and moments. No thrusters or external moments are required to perform vehicle stabilization. In addition, dynamic balance mechanisms may be implemented to facilitate vehicle stabilization without departing from the scope of the present invention.

In the illustrative implementation, the first reaction wheel 20 and the second reaction wheel 22 have the same mass and moments of inertia. The wheels 20 and 22 rotate about the x-axis 26 and the y-axis 28, respectively, but cannot rotate or translate about any other axes. The wheels 20 and 22 rotate about their respective axes 26 and 28 by the use of standard actuators implemented as standard DC torque motors (as discussed more fully below). The reaction wheels 20 and 22 are not momentum wheels in that they do not rotate at a fixed speed nominally. The wheels 20 and 22 have zero nominal speed.

The dynamical equations to follow pertain to the satellite 10 of FIG. 1 having a first reaction wheel 20 and a second reaction wheel 22. Those skilled in the art will appreciate that the following control equations do not represent the only method to implement the attitude control system the present invention.

The dynamical control equations to follow assume the following: for each mass body, i.e., the payload 14, the bus 16, the first reaction wheel 20, and the second reaction wheel 22, the inertia tensors have 0 product of inertia terms. Typically, in practice, the products of inertia terms remain small enough so that the dynamical equations to follow remain valid. It is also assumed that the attachments between the bodies 14, 16, 20, and 22 are perfect frictionless attachments. For example, the payload 14 and bus 16 are attached through the perfect pin Bapta joint 18 that allows the payload 14 and bus 16 to rotate about the z-axis 24, but not about any other axis.

By using Euler's equations of motion for each of the bodies 14, 16, 20, and 22, and starting at the outermost bodies (the wheels 20 and 22) and working toward the payload 14, one ordinarily skilled in the art can derive equations of motion and linearize them about a particular satellite trajectory.

Linearizing the equations of motion about a particular trajectory results in a linear system of equations that allows for full controllability of the orientation of the payload 14. The conservation of momentum does not allow all positional states of the satellite 10 to be fully controllable (the bus and wheels are not simultaneously controllable). However, in the present embodiment, it is only necessary to control the orientation of the payload 14.

In the nominal trajectory, the payload spins about the z-axis 24 at a desired spin rate $\omega_s$, while the transverse spin rates are zero. An exemplary linearizing trajectory is given by the following matrix equation:

$$\begin{pmatrix} \omega_{Px} \\ \omega_{Py} \\ \omega_{Pz} \\ \omega_{Wlx} \\ \omega_{Wly} \\ \rho \\ \dot{\rho} \\ \omega_{Bx} \\ \omega_{By} \\ \omega_{Bz} \end{pmatrix} = \begin{pmatrix} 0 \\ 0 \\ \omega_{Ps} \\ 0 \\ 0 \\ 0 \\ \omega_{Ps} - \omega_{Bs} \\ 0 \\ 0 \\ 0 \end{pmatrix} \quad [1]$$

where $\omega_{Px}$, $\omega_{Py}$ and $\omega_{Pz}$, are the angular velocities of the payload 14 about the x-axis 26, the y-axis 28, and the z-axis 24, respectively, with respect to inertial space. Similarly, $\omega_{Bx}$, $\omega_{By}$ and $\omega_{Bz}$, are the angular velocities of the bus 16 about the x-axis 26, the y-axis 28, and the z-axis 24, respectively, with respect to inertial space. In addition, $\omega_{W1x}$ is the angular velocity of the first wheel 20 about the x-axis 26; $\omega_{W2y}$ is the angular velocity of the second wheel 22 about the y-axis 28; $\omega_{Bs}$ is the angular velocity of the bus 16 about its spin axis which is the z-axis 24 in the present embodiment; $\omega_{Ps}$ is the angular velocity of the payload 14 about its spin axis which is also the z-axis 24 in the present embodiment; $\rho$ is the angle between the payload 14 and the bus 16; and $\rho'$ is the derivative of $\rho$.

In equation (1), it is assumed that the bus 16 is spinning at exactly the same rate as the payload 14, but in the opposite direction. Although, generally the bus 16 spins at an arbitrary rate compared to the spin rate of the payload 14. The bus 16 spins to null the total inertia of the satellite 10.

The linearizing trajectory of equation 1 results in the following linearized equations:

$$\begin{pmatrix} I_{Px} + I_T + I_{Bx} & 0 & 0 & 0 & 0 \\ 0 & I_{Py} + I_T + I_{By} & 0 & 0 & 0 \\ 0 & 0 & I_{Pz} & 0 & 0 \\ 0 & 0 & 0 & I_S & 0 \\ 0 & 0 & 0 & 0 & I_S \end{pmatrix} \begin{pmatrix} \dot{\omega}_{Px} \\ \dot{\omega}_{Py} \\ \dot{\omega}_{Pz} \\ \dot{\omega}_{W1x} \\ \dot{\omega}_{W2y} \end{pmatrix} =$$

$$\begin{pmatrix} 0 & -(I_{Pz} - I_{Py} - I_T - I_{Bx})\omega_{Ps} & 0 & 0 & I_S \omega_{Bs} \\ & -(2I_T + I_{Bx} + I_{Bz} - I_{By})\omega_{Bs} & & & \\ -(I_{Px} - I_{Pz} + I_T + I_{By})\omega_{Ps} & 0 & 0 & -I_S \omega_{Bs} & 0 \\ +(2I_T + I_{By} - I_{Bx} + I_{Bz})\omega_{Bs} & & & & \\ 0 & 0 & 0 & 0 & 0 \\ 0 & 0 & 0 & 0 & 0 \\ 0 & 0 & 0 & 0 & 0 \end{pmatrix}$$

$$\begin{pmatrix} \omega_{Px} \\ \omega_{Py} \\ \omega_{Pz} \\ \omega_{W1x} \\ \omega_{W2y} \end{pmatrix} + \begin{pmatrix} -1 & 0 & 0 \\ 0 & -1 & 0 \\ 0 & 0 & 1 \\ 1 & 0 & 0 \\ 0 & 1 & 0 \end{pmatrix} \begin{pmatrix} T_{W1com} \\ T_{W2com} \\ T_{Baptacom} \end{pmatrix}$$

and, $$(I_{Bz} + 2I_T)\dot{\omega}_{Bz} = -T_{Baptacom} \qquad [3]$$

where $\omega'$ denotes the derivative of angular velocity, i.e., angular acceleration. $I_{Px}$, $I_{Py}$ and $I_{Pz}$ are the inertias of the payload 14 about the x-axis 26, the y-axis 28, and the z-axis 24, respectively. $I_{Bx}$, $I_{By}$ and $I_{Bz}$ are the inertias of the bus 16 about the x-axis 26, the y-axis 28, and the z-axis 24, respectively. $I_T$ and is the inertia of each reaction wheel 20 about a transverse axis, i.e., the y-axis 28 and the z-axis 24 for the first reaction wheel 20 and the x-axis 26 and z-axis 24 for the second reaction wheel 22. Each reaction wheel 20 and 22 has an inertia of $I_S$ about the respective spin axis, i.e., the x-axis 26 and y-axis 28, respectively. $T_{Baptcom}$ is a Bapta torque command provided to the Bapta actuator 40 via the spacecraft computer 32 to control the rotation of the attitude control section 12 about the Bapta joint 18. $T_{W1com}$ is the torque command provided to the first wheel actuator 44 to control the spin of the first reaction wheel 20. $T_{W2com}$ is the torque command provided to the second wheel actuator 48 to control the spin of the second reaction wheel 22.

In general, $$(I)\begin{pmatrix} \dot{\omega}_{Px} \\ \dot{\omega}_{Py} \\ \dot{\omega}_{Pz} \\ \dot{\omega}_{W1x} \\ \dot{\omega}_{W2y} \end{pmatrix} = (A)\begin{pmatrix} \omega_{Px} \\ \omega_{Py} \\ \omega_{Pz} \\ \omega_{W1x} \\ \omega_{W2y} \end{pmatrix} + (B)\begin{pmatrix} T_{W1com} \\ T_{W2com} \\ T_{Baptacom} \end{pmatrix} \qquad [4]$$

where the matrices [I], [A] and [B] are as indicated in equation (2).

Those ordinarily skilled in the art can easily verify that equation (4) represents a controllable equation at any trajectory reasonably close to the linearized trajectory of equation (1). After the controllability is verified, a conventional gain scheduled controller, LPV controller and/or nonlinear controller can be used to construct locally stabilizing controllers to control the orientation of the satellite 10 in accordance with the rules specified in equation (4).

Those ordinarily skilled in the art can verify the controllability of the system 30 by computing the following quantities:

$$[I^{-1}B \; I^{-1}A^{-1}B \; I^{-2}A^2I^{-1}B \; I^{-3}A^3I^{-1}B \; I^{-4}A^4I^{-1}B] \qquad [5]$$

and determining the rank of the resulting equation. If the rank is five for this problem, then the system is completely controllable at this operating point.

In the present specific embodiment, $$I^{-1}B = \begin{pmatrix} \frac{-1}{I_{Px}+I_T+I_{Bx}} & 0 & 0 \\ 0 & \frac{-1}{I_{Py}+I_T+I_{By}} & 0 \\ 0 & 0 & \frac{1}{I_{Px}} \\ \frac{1}{I_S} & 0 & 0 \\ 0 & \frac{1}{I_S} & 0 \end{pmatrix}$$

$$I^{-1}AI^{-1}B =$$

$$\begin{pmatrix} 0 & \frac{\begin{pmatrix}-(I_{Pz}-I_{Py}-I_T-I_{Bx})\omega_{Ps} \\ -(2I_T+I_{Bx}+I_{Bz}-I_{By})\omega_{Bs}\end{pmatrix}}{I_{Px}+I_T+I_{Bx}} & 0 & 0 & \frac{I_S\omega_{Bs}}{I_{Px}+I_T+I_{Bx}} \\ \frac{\begin{pmatrix}-(I_{Px}-I_{Pz}+I_T+I_{By})\omega_{Ps} \\ +(2I_T+I_{By}-I_{Bx}+I_{Bz})\omega_{Bs}\end{pmatrix}}{I_{Py}+I_T+I_{By}} & 0 & 0 & \frac{-I_S\omega_{Bs}}{I_{Py}+I_T+I_{By}} & 0 \\ 0 & 0 & 0 & 0 & 0 \\ 0 & 0 & 0 & 0 & 0 \\ 0 & 0 & 0 & 0 & 0 \end{pmatrix} \begin{pmatrix} \frac{-1}{I_{Px}+I_T+I_{Bx}} & 0 & 0 \\ 0 & \frac{-1}{I_{Py}+I_T+I_{By}} & 0 \\ 0 & 0 & \frac{1}{I_{Px}} \\ \frac{1}{I_S} & 0 & 0 \\ 0 & \frac{1}{I_S} & 0 \end{pmatrix} =$$

$$\begin{pmatrix} 0 & \frac{(I_{Pz}-I_{Py}-I_T-I_{Bx})\omega_{Ps}+(2I_T+I_{Bx}+I_{Bz}-I_{By}+I_S)\omega_{Bs}}{(I_{Px}+I_T+I_{Bx})^2} & 0 \\ \frac{(I_{Px}-I_{Pz}+I_T+I_{By})\omega_{Ps}-(2I_T+I_{By}-I_{Bx}+I_{Bz}-I_S)\omega_{Bs}}{(I_{Px}+I_T+I_{Bx})^2} & 0 & 0 \\ 0 & 0 & 0 \\ 0 & 0 & 0 \\ 0 & 0 & 0 \end{pmatrix}$$

The rank of B and AB is five unless:

$$(I_{Pz}-I_{Py}-I_T-I_{Bx})\omega_{Ps}+(2I_T+I_{Bx}+I_{Bz}-I_{By}+I_S)\omega_{Bs}=0$$

$$(I_{Pz}-I_{Px}-I_T-I_{By})\omega_{Ps}+(2I_T+I_{By}+I_{Bz}-I_{Bx}+I_S)\omega_{Bs}=0 \quad [6]$$

Note that the conservation of angular momentum requires (for the present orientation):

$$I_{Pz}\omega_{Ps}+(2I_T+I_{Bz})\omega_{Bs}0 \quad [7]$$

So that equations (6) simplify to:

$$(-I_{Py}-I_T-I_{Bx})\omega_{Ps}+(I_{Bx}-I_{By}+I_S)\omega_{Bs}=0$$

$$(-I_{Px}-I_T-I_{By})\omega_{Ps}+(I_{By}-I_{Bx}+I_S)\omega_{Bs}=0 \quad [8]$$

Neither the spin rate of the bus 16 nor the spin rate of the payload 14 is zero, requiring:

$$(-I_{Py}-I_T-I_{Bx})(I_{By}-I_{Bx}+I_S)+(I_{Bx}-I_{By}+I_S)(I_{Px}+I_T+I_{By})=0 \quad [9]$$

In general, equation (9) is not zero. Hence, the attitude control section 12 is completely controllable by the system 30 of the satellite 10 and any general control method can be used to control system 30: classical, pole-placement, H-infinity, etc. Those skilled in the art can easily implement appropriate gain scheduling to change the controller as a function of payload to bus angle.

In the pathological case when $I_{Bx}=I_{By}$ and $I_{Px}=I_{Py}$ (i.e., both the payload and the bus resemble perfect cylinders), a controllability matrix of less than 5 occurs wherein:

$$I_S(-I_{Py}I-I_T-I_{Bx})+I_S(I_{Px}+I_T+I_{By})=I_S(I_{Px}+I_T+I_{By}-I_{Py}-I_T-I_{Bx})=I_S(I_{Px}-I_{Py})=0 \quad [10]$$

This implies that the orientation of the payload 14 is controllable or the orientation of the wheels 20 and 22 is controllable, but not both. Using these controllability assumptions, equation (2) becomes:

$$\begin{pmatrix} I_{PT}+I_T+I_{BT} & 0 & 0 & 0 & 0 \\ 0 & I_{PT}+I_T+I_{BT} & 0 & 0 & 0 \\ 0 & 0 & I_{Pz} & 0 & 0 \\ 0 & 0 & 0 & I_S & 0 \\ 0 & 0 & 0 & 0 & I_S \end{pmatrix} \begin{pmatrix} \dot{\omega}_{Px} \\ \dot{\omega}_{Py} \\ \dot{\omega}_{Pz} \\ \dot{\omega}_{W1x} \\ \dot{\omega}_{W2y} \end{pmatrix} = \quad [11]$$

$$\begin{pmatrix} 0 & (I_{PT}+I_{BT})\omega_{Ps}-I_T\omega_{Bs} & 0 & 0 & I_S\omega_{Bs} \\ -(I_{PT}+I_{BT})\omega_{Ps}+I_T\omega_{Bs} & 0 & 0 & -I_S\omega_{Bs} & 0 \\ 0 & 0 & 0 & 0 & 0 \\ 0 & 0 & 0 & 0 & 0 \\ 0 & 0 & 0 & 0 & 0 \end{pmatrix}$$

$$\begin{pmatrix} \omega_{Px} \\ \omega_{Py} \\ \omega_{Pz} \\ \omega_{W1x} \\ \omega_{W2y} \end{pmatrix} + \begin{pmatrix} -1 & 0 & 0 \\ 0 & -1 & 0 \\ 0 & 0 & 1 \\ 1 & 0 & 0 \\ 0 & 1 & 0 \end{pmatrix} \begin{pmatrix} T_{W1com} \\ T_{W2com} \\ T_{Baptacom} \end{pmatrix}$$

A resulting control law is:

$$\begin{pmatrix} T_{W1com} \\ T_{W2com} \\ T_{Baptacom} \end{pmatrix} = \begin{pmatrix} K_1\omega_{Px} \\ K_2\omega_{Py} \\ -K_3\omega_{Pz} \\ 0 \\ 0 \end{pmatrix} \quad [12]$$

where $K_1$, $K_2$ and $K_3$ are gain coefficients easily determined to suit a particular application by those ordinarily skilled.

The control law of equation (12) stabilizes the platform rates, bounding the uncontrollable states (the wheel rates). This is the desired behavior.

FIG. 3 is diagram showing key functional blocks of a program 51 implemented by the spacecraft computer 32 of FIG. 2. The program includes position detection routines 52, position comparison routines 54, error compensation routines 56 and actuator control routines 58.

With reference to FIGS. 2 and 3, the position detection routines 52 sample the gyroscope sensor package 34 and the star tracker 36 for current spacecraft position information and receive position commands from telemetry such as the receiver 50. The current spacecraft position information is provided to the comparison routines 54 along with any commanded position information from the receiver 50.

The comparison routines 54 compare the commanded position as indicated by signals received form the receiver 50 or indicated by signals received from a preceding output of the error compensation routines 56, with the current position of the spacecraft 10 as provided via the position detection routines. The comparison routines 54 provide an error signal representative of the difference in positions of the commanded position and the current position.

The error compensation routines 56 provide position commands for adjusting the position of the spacecraft 10 to minimize the error signal. The actuator control routines 58 apply applicable torque commands to the Bapta actuator 40 and the appropriate wheel actuator(s) 44 and/or 48.

The individual routines 52, 54, 56, and 58 may be constructed by those ordinarily skilled in the art.

Figure 4:
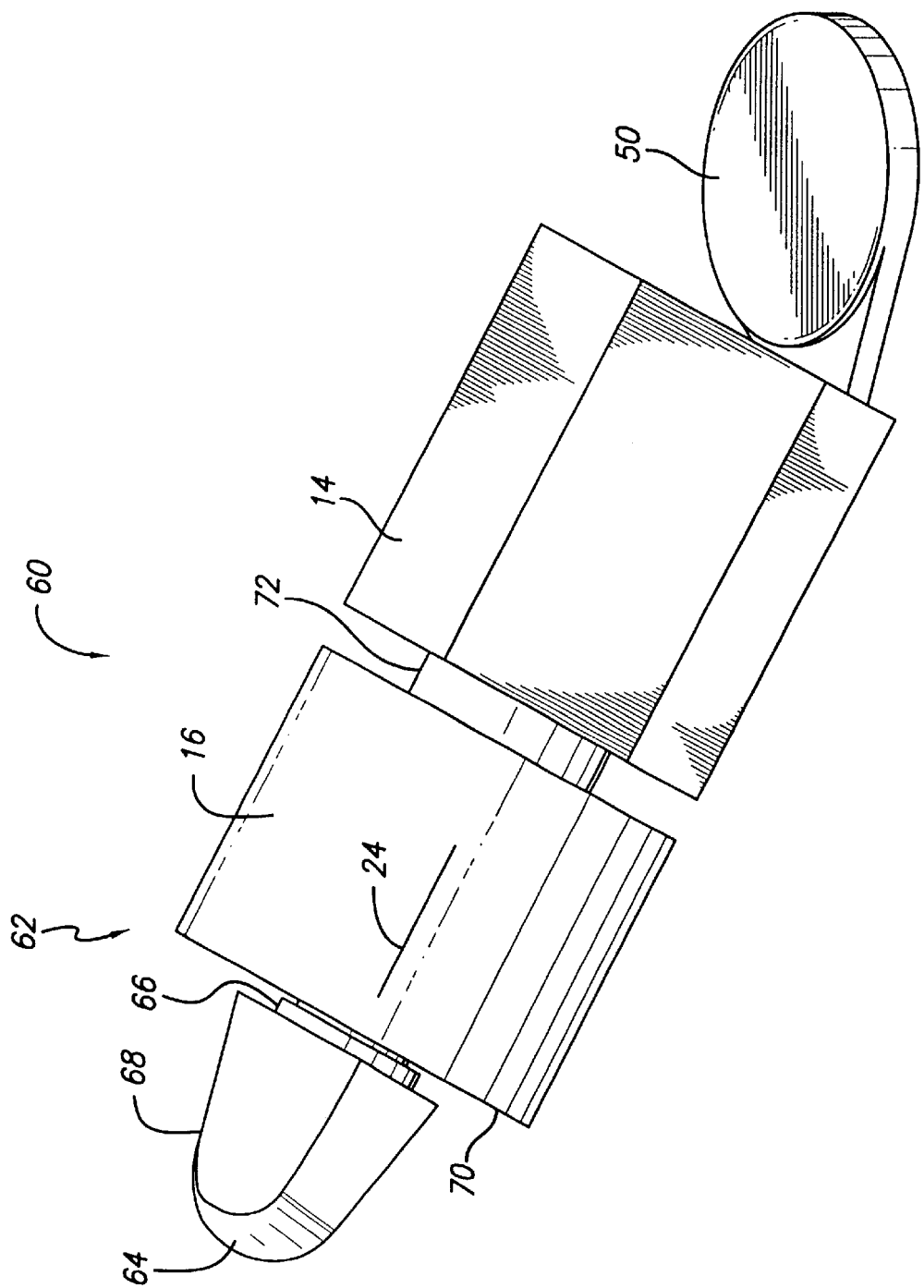
FIG. 4 is a diagram of a satellite employing a first alternative embodiment of the spacecraft attitude control system of the present invention.

FIG. 4 is a diagram of a second satellite 60 employing a first alternative embodiment 62 of the spacecraft attitude control system of the present invention. The first alternative embodiment 62 includes a gimbaled reaction wheel 64 mounted on a pivot 66 connected to a rear face 70 of the cylindrical spacecraft bus 16. The pivot 66 can rotate only about a z-axis 24 of the satellite 60. The gimbaled reaction wheel 64 is mounted on the pivot 66 such that the spin axis of the wheel 64 is perpendicular to the z-axis 24, which is the satellite spin axis.

Figure 5:
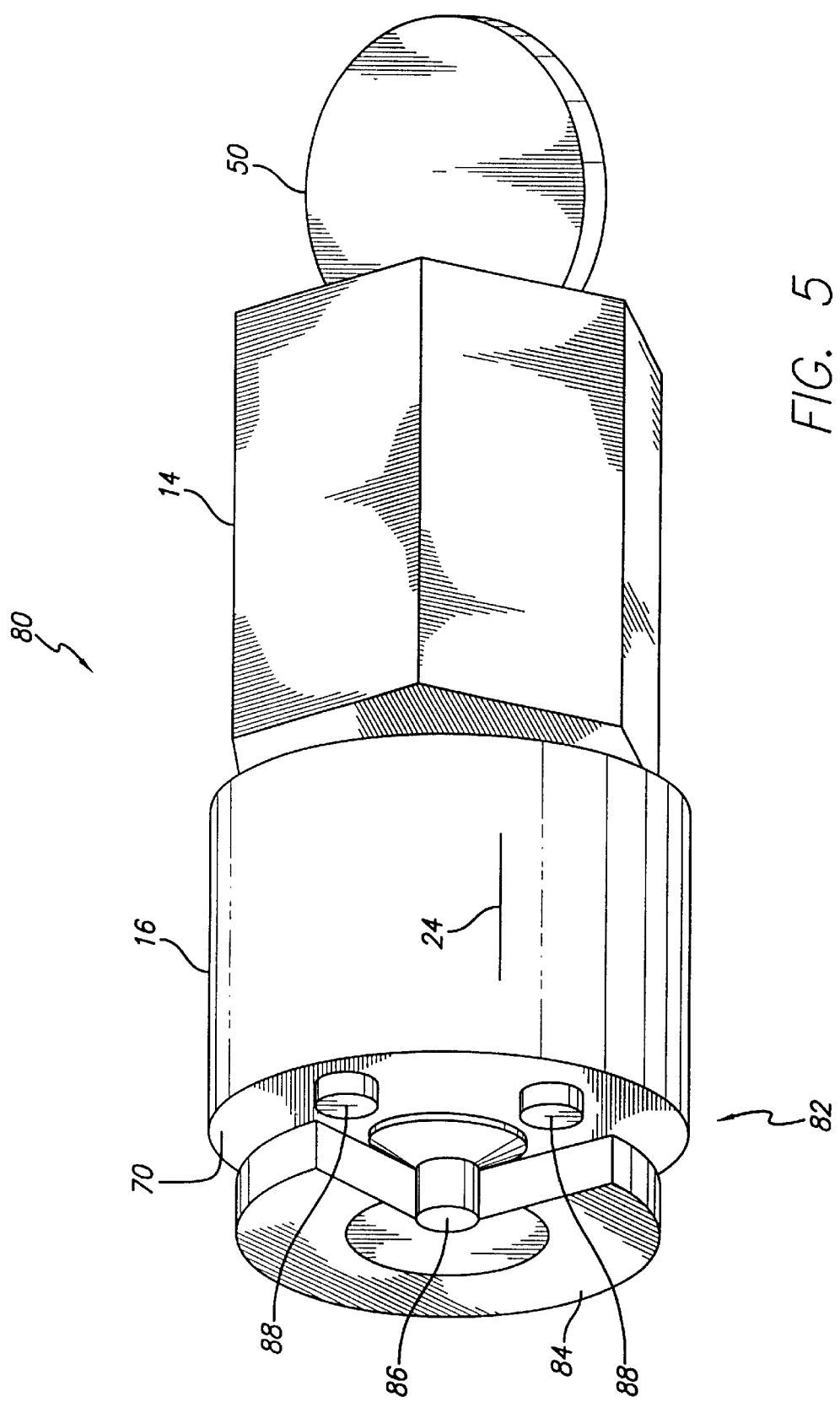
FIG. 5 is a diagram of a satellite employing a second alternative embodiment of the spacecraft attitude control system of the present invention.

In operation, with reference to FIGS. 2 and 5, the attitude control program running on a spacecraft computer 32 detects movement of the satellite 60 via signals received form the gyroscope sensor package 34 and the star tracker 36. The current satellite orientation is determined via the star tracker 36 and the gyroscope sensor package 34. The attitude control program uses the current satellite movement information to generate control signals to the Bapta actuator 40 that command the bus 16 to rotate about the z-axis 24 to cancel existing satellite momentum. After the momentum about the z-axis 24 is zero as is indicated by feedback from the gyroscope sensor package 34, the pivot 66 is actuated via a pivot actuator (not shown) to orient the gimbaled reaction wheel 64 to a predetermined orientation. After the gimbaled reaction wheel 64 is in the desired orientation, the reaction wheel 64 is spun via control signals to a wheel actuator (not shown) to create a torque in a desired direction to properly orient the satellite in accordance with satellite orientation information stored in memory on the spacecraft computer 32. The satellite orientation information may be updated or changed by transmission of new orientation information to the receiver 50.

In the present embodiment, the gimbaled reaction wheel 64 is free to rotate about a single axis, i.e., the z-axis 24. The gimbaled wheel 64 is housed in a gimbal unit 68 that can rotate about the same axis as the Bapta axis, i.e., the z-axis 24.

The control system implemented by attitude control program running on the spacecraft computer (see FIG. 2) generates a torque command T to the bus 16 in the direction $\vec{V}=x_i\vec{x}+y_i\vec{y}$. To implement the command T, a high bandwidth loop (not shown) between the spacecraft computer and the gimbal unit 68 drives the gimbal unit 68 to a desired direction. In particular, the unit 68 is driven to the angle θ given by:

$$\theta = \tan^{-1}\left(\frac{y_i}{x_i}\right) \quad [13]$$

The gimbaled reaction wheel 64 is then is commanded with the torque command T, putting the desired torque on the bus 16 in a desired direction. The bandwidth (say 10 Hz or more) of the control loop (not shown) implemented to position the gimbaled reaction wheel 64 is much higher than the bandwidth (typically 0.01–0.1 Hz) of the control loop implemented to control the bus attitude via application of the torque command T. As a result, any interference between control loops is minimized. Implementation details of the above discussed control loops are application dependent. Such details are easily determined by those ordinarily skilled in the art FIG. 5 is a diagram of a third satellite 80 employing a second alternative embodiment 82 of the spacecraft attitude control system of the present invention. The second alternative embodiment 82 includes a ring-shaped reaction mass 84 mounted to the spacecraft bus 16 via a flexure suspension 86 connected approximately to the center of the reaction mass 84. Voice-coil actuators 88 are positioned between the reaction mass 84 and the rear surface 70 of the bus 16.

After the momentum of the satellite 80 is cancelled via the counter rotation of bus 16, the voice coil actuators 88 are selectively actuated to push on the reaction mass 84. When the voice coil actuators 88 push on the reaction mass 84, they create reaction forces in desired directions to properly orient the satellite 80 in accordance with a predetermined desired satellite orientation.

The voice coil actuators 88 apply forces against the high inertia reaction mass 84 that is mounted to the spacecraft by the flexure suspension 86. The flexure suspension 86 is very soft (<2 Hz) in the x and y angular directions, but very stiff in the z angular direction (>100 Hz). It is also very stiff in the x, y and z translational directions.

By driving the voice coil actuators 88 in pairs, moments are applied to the reaction mass 84 in the x and y directions. By Newton's third law, applying moments to the reaction mass also applies moments to the spacecraft bus 16. Since voice actuators are typically capable of 10 lbs of force, spacing the voice coils 2 feet apart yields maximum moments of 20 ft-lbs, a substantial torque capability. Using voice coils with larger force capabilities, or choosing a larger spacing distance for the voice coils can further increase this torque capability.

Typical flexure suspensions such as the flexure suspension 86 used in the present embodiment, will limit the movement of the reaction mass 84 to approximately ±5° of travel. The reaction mass 88 has a relatively large moment of inertia but is relatively light. This is achieved by concentrating the mass of the reaction mass 84 on the outside edge of the of the reaction mass 84. This helps to reduce the probability that the reaction mass 84 will reach its travel limits during high torque maneuvers, while minimizing any undesirable additional spacecraft weight.

Those skilled in the art will appreciate that other devices may be used in place of the flexure suspension 86 without departing from the scope of the present invention. For example, the flexure suspension 86 may be replaced with bearings. In addition, an outer gimbal may be connected to the reaction mass 84 to accommodate more travel by the reaction mass 84.

Numerous systems and methods exist to generate internal moments on a spacecraft. It is intended by the claims of the present invention to include these systems and methods within the scope thereof.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. An attitude control system for a spacecraft having a payload and an attitude control section, said attitude control system comprising:

a mass disposed in said attitude control section;

a single degree of freedom joint connecting said mass to said payload whereby the mass has a single degree of freedom relative to the payload about a first axis;

first means for rotating said mass;

second means for controlling said first means; and third means for controlling rotation of said spacecraft about a second axis, said third means including:
a first reaction wheel and
a second reaction wheel having an axis of rotation at an angle to an axis of rotation of said first reaction wheel.

2. The invention of claim 1 wherein said first reaction wheel is mounted on a gimbal, said gimbal having an axis of rotation approximately concentric with respect to said first axis, said first reaction wheel mounted so that an axis of rotation of said first reaction wheel is aligned with said second axis.

3. The invention of claim 1 wherein said first reaction wheel has an axis of rotation approximately perpendicular to said first axis.

4. The invention of claim 1 wherein said angle is ninety degrees.

5. The invention of claim 1 wherein said first and second reaction wheels are rigidly mounted to said mass and free to spin about their respective axis.

6. The invention of claim 1 wherein said first and second reaction wheels are selectively spun via first and second actuators in response to the receipt of first and second steering control signals, respectively.

7. The invention of claim 6 further including spacecraft steering software running on a computer, said computer in communication with a gyroscope sensor package or a position tracker, said steering software for generating said first and second steering control signals.

8. The invention of claim 7 wherein said spacecraft includes a bus structure connected to a payload via a Bapta joint, each of said first and second reaction wheels mounted on said bus via a single degree of freedom joint.

9. The invention of claim 8 wherein said steering software generates said first and second steering control signals in accordance with the following equations:

$$\begin{pmatrix} I_{PT} + I_T + I_{BT} & 0 & 0 & 0 & 0 \\ 0 & I_{PT} + I_T + I_{BT} & 0 & 0 & 0 \\ 0 & 0 & I_{Pz} & 0 & 0 \\ 0 & 0 & 0 & I_S & 0 \\ 0 & 0 & 0 & 0 & I_S \end{pmatrix} \begin{pmatrix} \omega_{Px} \\ \omega_{Py} \\ \omega_{Pz} \\ \omega_{W1x} \\ \omega_{W2y} \end{pmatrix} =$$

$$\begin{pmatrix} 0 & (I_{PT}+I_{BT})\omega_{Ps}-I_T\omega_{Bs} & 0 & 0 & I_S\omega_{Bs} \\ -(I_{PT}+I_{BT})\omega_{Ps}+I_T\omega_{Bs} & 0 & 0 & -I_S\omega_{Bs} & 0 \\ 0 & 0 & 0 & 0 & 0 \\ 0 & 0 & 0 & 0 & 0 \\ 0 & 0 & 0 & 0 & 0 \end{pmatrix} \begin{pmatrix} \omega_{Px} \\ \omega_{Py} \\ \omega_{Pz} \\ \omega_{W1x} \\ \omega_{W2y} \end{pmatrix} +$$

$$\begin{pmatrix} -1 & 0 & 0 \\ 0 & -1 & 0 \\ 0 & 0 & 1 \\ 1 & 0 & 0 \\ 0 & 1 & 0 \end{pmatrix} \begin{pmatrix} T_{W1com} \\ T_{W2com} \\ T_{Baptacom} \end{pmatrix}$$

where $\omega_{Px}$, $\omega_{Py}$ and $\omega_{Pz}$, are the angular velocites of said payload about an x-axis, y-axis, and z-axis, respectively, with respect to inertial space; $\omega_{Bx}$, $\omega_{By}$ and $\omega_{Bz}$, are the angular velocites of said bus about said x-axis, y-axis, and the z-axis, respectively, with respect to inertial space; $\omega_{W1x}$ is the angular velocity of said first reaction wheel about said x-axis; $\omega_{W2y}$ is the angular velocity of said second wheel about said y-axis; $\omega_{Bs}$ is the angular velocity of said bus about the spin axis of said bus; $\omega_{Ps}$ is the angular velocity of said payload about the spin axis of said payload; $\omega'$ denotes angular acceleration; $I_{Px}$, $I_{Py}$ and $I_{Pz}$ are the moments of inertia of said payload about said x-axis, y-axis, and said z-axis, respectively; $I_{Bx}$, $I_{By}$ and $I_{Bz}$ are the inertias of said bus about said x-axis, y-axis, and z-axis, respectively; $I_T$ and is the inertia of each of said reaction wheels about a transverse axis, i.e., said y-axis and said z-axis for said first reaction wheel and said x-axis and said z-axis for said second reaction wheel, each of said first and second reaction wheels of which have inertia of $I_S$ about the respective spin axis, i.e., said x-axis and said y-axis, respectively; $T_{W1com}$ and $T_{W2com}$ are commands representative of said first and second steering control signals, respectively; and $T_{Baptacom}$ is a command to an actuator included in said first means for selectively rotating said mass to cancel spacecraft momentum.

10. The invention of claim 1 wherein said first means includes means for rotating said mass at a rate sufficient to cancel existing spacecraft momentum.

11. The invention of claim 10 wherein said means for rotating includes an actuator for rotating said mass in response to an actuator control signal received by said actuator via a computer.

12. The invention of claim 11 further including means for determining said spacecraft momentum.

13. The invention of claim 12 wherein said means for determining said spacecraft momentum includes a gyroscope sensor package in communication with said computer, said gyroscope sensor package providing a rate signal to said computer, said rate signal representative of said existing spacecraft momentum.

14. The invention of claim 13 wherein said computer runs software for generating said actuator control signal in response to the receipt of said rate signal from said gyroscope sensor package.

15. The invention of claim 1 wherein said third means includes a reaction mass.

16. The invention of claim 15 wherein said reaction mass is mounted to said spacecraft via a flexure suspension.

17. The invention of claim 15 further including a first force actuator for applying a first force to said reaction mass to facilitate spacecraft orientation.

18. The invention of claim 17 further including a second force actuator for applying a second force to said reaction mass to facilitate spacecraft orientation.

19. The invention of claim 18 wherein said first force actuator and said second force actuator are voice coil actuators.

20. The invention of claim 18 wherein said first and second force actuators selectively produce first and second forces, respectively, in response to the receipt of steering control signals.

21. The invention of claim 20 further including spacecraft steering software running on a computer, said computer in communication with a gyroscope sensor package, for generating said steering control signals.

22. The invention of claim 1 wherein said mass includes a storage section.

23. The invention of claim 22 wherein said mass has a moment of inertia on the order of the moment of inertia of said spacecraft.

24. The invention of claim 23 wherein said spacecraft is a satellite.

25. The invention of claim 24 wherein said satellite includes a bus section and a payload section.

26. The invention of claim 25 wherein said mass includes said bus section.

27. A system for adjusting the orientation of a spacecraft comprising:
a mass having a moment of inertia on the order of the moment of inertia of said spacecraft;
first means for selectively spinning said mass so that the total momentum of said spacecraft is approximately zero; and
second means for orienting said spacecraft via the application of internal spacecraft forces.

28. A system for adjusting the orientation of a spacecraft comprising:
a mass having a moment of inertia on the order of the moment of inertia of said spacecraft;
a first control loop for selectively spinning said mass so that the total momentum of said spacecraft is approximately zero; and
a second control loop for orienting said spacecraft via the application of internal spacecraft forces.

29. A light-weight satellite comprising:
a payload;
a computer running satellite control software;
an antenna for receiving control signals and providing said control signals to said computer, said computer providing first and second output control signals;
first means for canceling any momentum of said spacecraft via a counter-rotating Bapta mechanism controlled by said first output control signal; and
second means for orienting said spacecraft via the application of internal spacecraft forces in response said second output control signal.

30. The invention of claim 29 wherein said first means includes means for providing a first feedback input to said computer to facilitate the construction of said first output control signal by a control software running on said computer.

31. The invention of claim 29 wherein said second means includes means for providing a second feedback input to said computer to facilitate the construction of said second output control signal by control software running on said computer.

32. A method for adjusting the orientation of a spacecraft comprising:

selectively spinning a mass having a moment of inertia on the order of the moment of inertia of said spacecraft mass at a rate sufficient to cancel the total momentum of said spacecraft and orienting said spacecraft via the application of internal spacecraft forces.

33. An attitude control system for a spacecraft having a payload and an attitude control section, said attitude control system comprising:

a mass disposed in said attitude control section;

a single degree of freedom joint connecting said mass to said payload whereby the mass has a single degree of freedom relative to the payload about a first axis;

first means for rotating said mass;

second means for controlling said first means; and third means for controlling rotation of said spacecraft about a second axis, said third means including a first reaction wheel and mounted on a gimbal, said gimbal having an axis of rotation approximately concentric with respect to said first axis, said first reaction wheel mounted so that an axis of rotation of said first reaction wheel is aligned with said second axis.

34. An attitude control system for a spacecraft having a payload and an attitude control section, said attitude control system comprising:

a mass disposed in said attitude control section;

a single degree of freedom joint connecting said mass to said payload whereby the mass has a single degree of freedom relative to the payload about a first axis;

first means for rotating said mass;

second means for controlling said first means;

third means for controlling rotation of said spacecraft about a second axis, said third means including a reaction mass mounted to said spacecraft via a flexure suspension;

a first force actuator for applying a first force to said reaction mass to facilitate spacecraft orientation; and a second force actuator for applying a second force to said reaction mass to facilitate spacecraft orientation, wherein said first force actuator and said second force actuator are voice coil actuators.

* * * * *